United States Patent [19]

Welch et al.

[11] 4,372,517

[45] Feb. 8, 1983

[54] SLOT-TYPE ACCESSORY MOUNTING

[75] Inventors: Joseph J. Welch, Huntington Beach; William C. Grove, Tujunga; Michael E. Moran, Newhall, all of Calif.

[73] Assignee: Lockheed Corporation, Burbank, Calif.

[21] Appl. No.: 165,260

[22] Filed: Jul. 2, 1980

[51] Int. Cl.[3] .......... F16M 11/00

[52] U.S. Cl. .......... 248/267; 248/222.3

[58] Field of Search .......... 248/222.1, 222.3, 222.4, 248/223.1, 223.2, 343, 637; 403/342, 348

[56] References Cited

U.S. PATENT DOCUMENTS

| | | | |
|---|---|---|---|
| 1,270,296 | 6/1918 | Jeune | 248/343 X |
| 2,317,729 | 4/1943 | Bruno | 403/348 X |
| 2,368,537 | 1/1945 | Gilbert . | |
| 2,439,161 | 4/1948 | DuBois . | |
| 2,544,151 | 3/1951 | Gilbert . | |
| 2,553,220 | 5/1951 | Troeger . | |
| 2,645,438 | 7/1953 | Kalikow . | |
| 2,683,006 | 7/1954 | Nichols . | |
| 2,697,570 | 12/1954 | Snyder . | |
| 2,978,265 | 4/1961 | Cluff et al. . | |
| 3,104,901 | 9/1963 | Potter | 403/336 |
| 3,676,570 | 7/1972 | Gabb | 248/343 X |

FOREIGN PATENT DOCUMENTS

| | | | |
|---|---|---|---|
| H 23354 | 1/1956 | Fed. Rep. of Germany | 403/338 |
| 617576 | 2/1949 | United Kingdom | 248/637 |
| 754062 | 8/1956 | United Kingdom | 248/367 |

*Primary Examiner*—William H. Schultz

*Attorney, Agent, or Firm*—Victor A. DiPalma

[57] ABSTRACT

The invention is a slot-type accessory mounting 10 and process for quick attach-detach mounting an accessory 4 to an engine gearbox 2. The accessory mounting 10 includes a flange 1 which is provided with a plurality of circumferentially spaced axially protruding studs 7 attached to the gearbox 2 by screws 12. Slotted collar 3 is rotatably secured to accessory 4 by retaining ring 5 which is attached to the accessory 4 by stud nuts 21. The narrow end of slots 6 in collar 3 engage the studs 7 and the entire assembly is held together by nuts 9. Retaining ring 5 is provided with an alignment pin 22 which fits into bore 23 of flange 1 assuring proper alignment of the accessory 4 and gearbox 2. The process of mounting accessory 4 to gearbox 2 is carried out by aligning pin 22 and bore 23, bringing the flange 1 and retaining ring 5 together, passing the nut 9 carrying studs 7 through the larger end of slots 6 in collar 3 rotating collar 3 to secure studs 7 in the narrow end of slots 6, and torquing the nuts 9 to tighten the assembly. The quick detach process is carried out by loosening nuts 9 and rotating collar 3 so that studs 7 and nuts 9 align with the larger end of slots 6 in collar 3 allowing axial movement of accessory 4 of relative to gearbox 2.

19 Claims, 11 Drawing Figures

18
3
14
28
10
1
15
12
2
20
19
5
4
11
13
16
17
7
9
30
31
t 3
1
10
26
5
21
24
25
4

6
3
1
9
7
2
10
12
13
4
5
11

FIG. 4
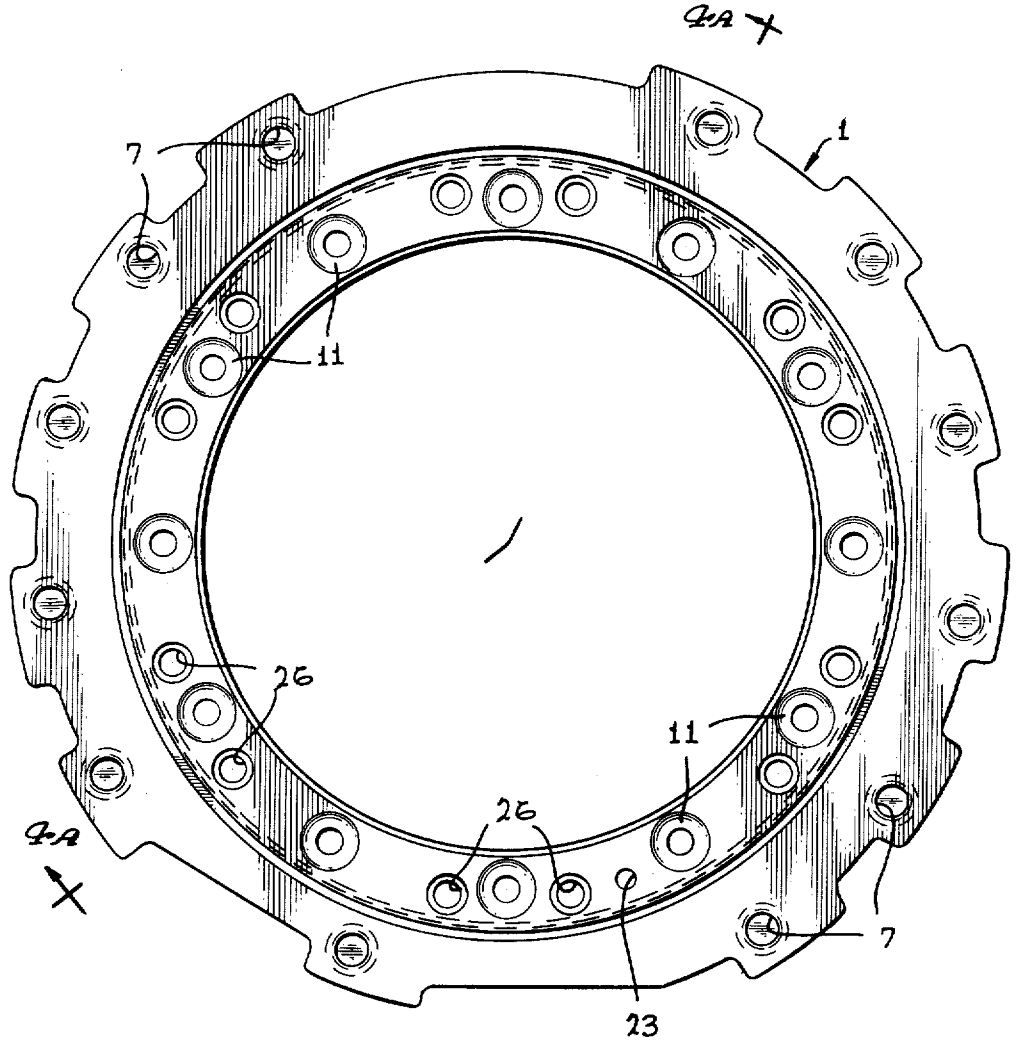
FIG. 4A

FIG. 5
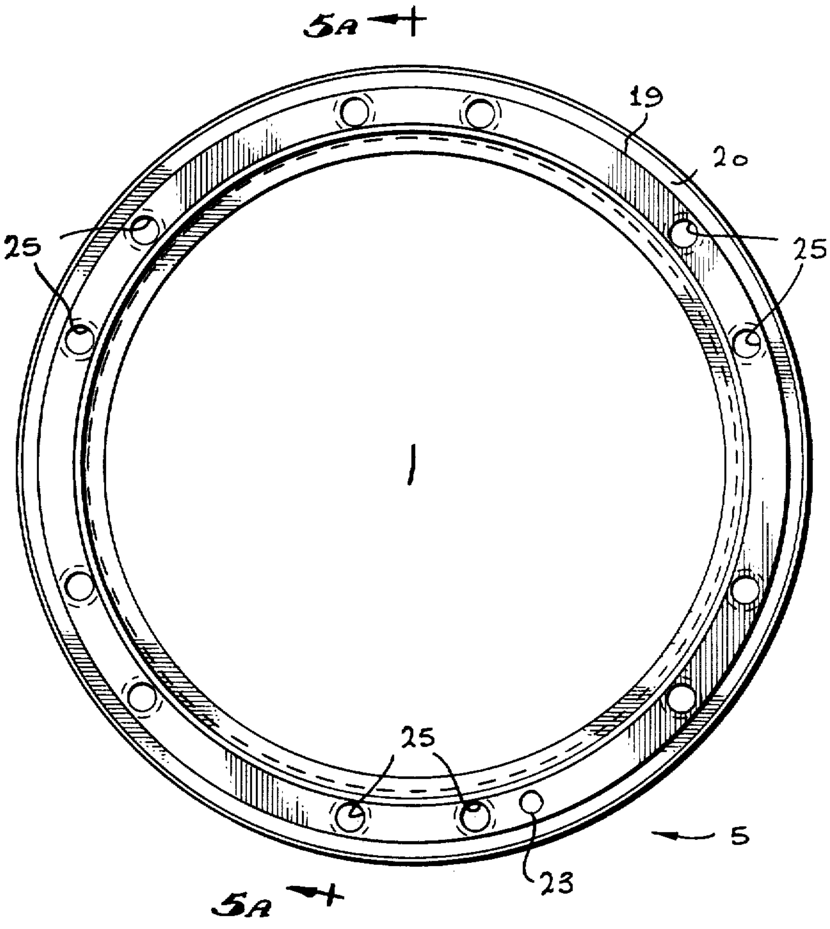
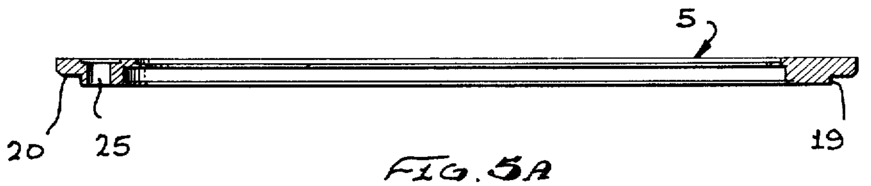
FIG. 5A

FIG. 6
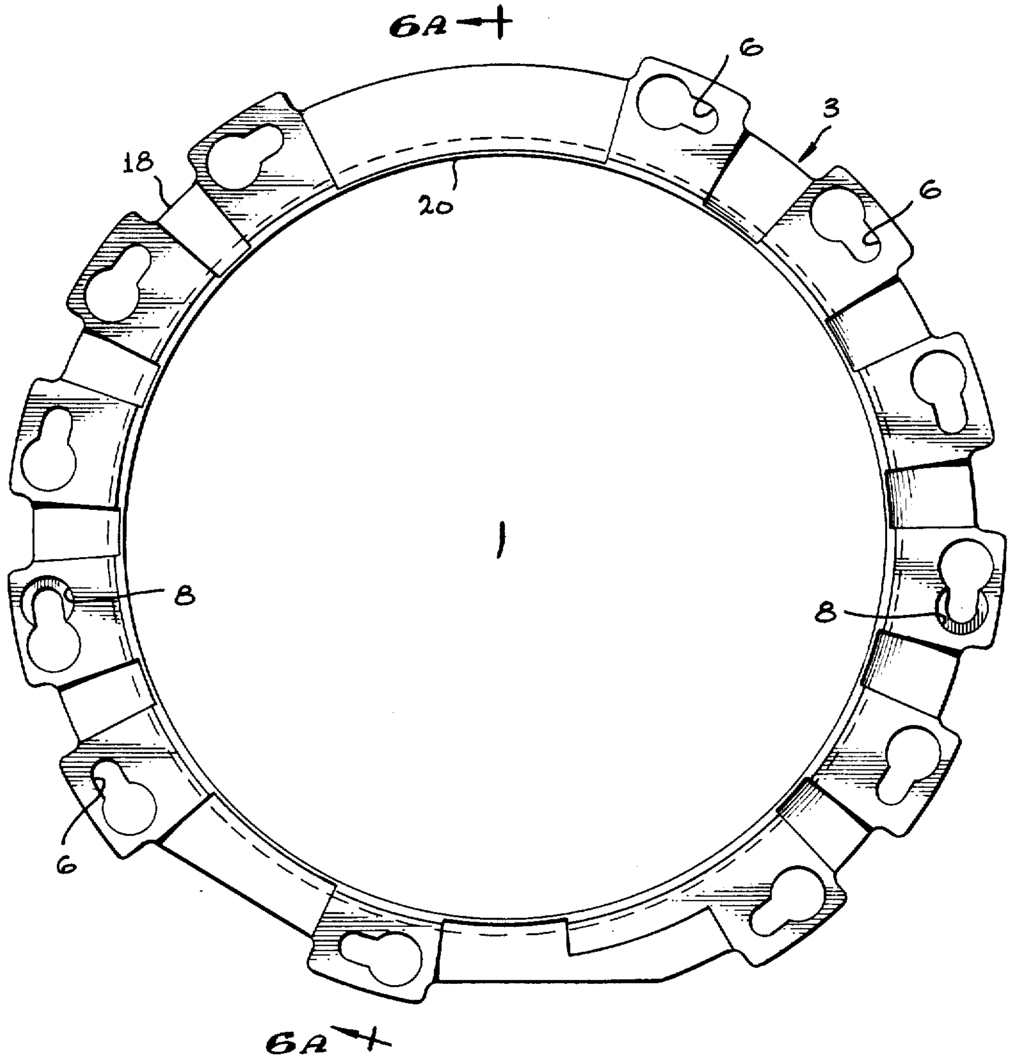
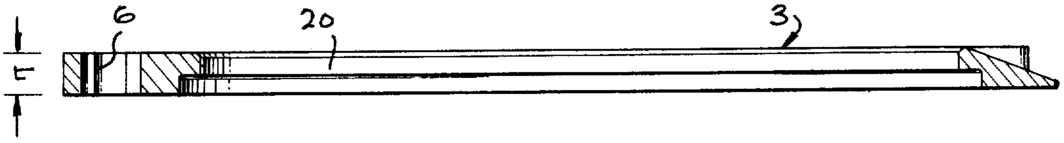
FIG. 6A

SLOT-TYPE ACCESSORY MOUNTING

TECHNICAL FIELD

The invention relates generally to a mounting device for positive mounting of two members, and in particular for quick attach-detach mounting of an engine driven accessory on an aircraft engine.

BACKGROUND ART

There is a need for quick attach-detach mechanisms which can be utilized not only to enable quick mounting or dismounting of one member to or from another but which also provide for a very secure mounting. This need is particularly pronounced in the aircraft industry wherein it is often desired to mount, inspect and service accessories which weigh in excess of one hundred fifty pounds, such as for example, aircraft engine integrated drive generators. In addition, the space provided around aircraft engines is typically small and relatively inaccessible with the result that it is often difficult to install, service and remove accessories. Thus it is highly desirable that a quick attach-detach mechanism, with a minimum number of assembly steps and parts and which will facilitate installation within this minimal space, be utilized.

Because of the accessory weights typically involved and the limited working area associated with aircraft engines the mounting of engine accessories should ideally be carried out as quickly as possible with a minimum of relative movement, both axially and radially, between the parts being assembled. After mounting, the attach-detach mechanism should perform a positive securing function with no loosening and wear characteristics as a result of engine input and other vibrations.

One prior art approach to providing a quick attach-detach mechanism is disclosed in U.S. Pat. No. 2,645,438, entitled "Mounting Device For Engine Accessories", by I. Kalikow. As disclosed therein, a mounting flange having a plurality of circumferentially extending lugs is secured to an engine casing. The member to be mounted, in this case a dynamoelectric machine, is provided with a circular shoulder and a plurality of lugs projecting from one end of the dynamoelectric machine which form grooves adapted to mate with or fit about wedge shaped lugs projecting from the mounting flange. Assembly is carried out by inserting the end portion of the dynamoelectric machine within the mounting flange. The dynamoelectric machine is then rotated until the two sets of projecting lugs are aligned. Once aligned, the lugs are constricted to wedge tightly within accommodating grooves provided by a clamping means which is tightened around the circumference of the mounting flange.

One of the problems associated with this type of mechanism and assembly procedure is that the dynamoelectric machine must be rotated during the assembly operation. In some aircraft, such machines can weigh in excess of one hundred and fifty pounds. For this reason it is undesirable to utilize a mechanism which would require, not only elevating and aligning of the dynamoelectric or other member with the member to which it is to be joined, but also rotating of the members relative to each other.

Another problem associated with the '438 patent mechanism is the requirement that the wedge-shaped lugs and grooves be machined to provide the desired precision for suitable operation of the mechanism. This machining of such parts can be an expensive and time consuming operation. Moreover, in utilizing a split clamping ring held at opposite sides by threaded screws, yet another problem is introduced. In high vibration environments these screws are subject to loosening, thereby leading to a loosening of the firmly engaged flange lugs. While complex safety devices may well prevent a severe disconnect problem, such systems typically, nevertheless, require frequent monitoring and servicing.

Finally, rotation of the dynamoelectric machine and placement of a ring about the circumference of the mounting flange are operations which can require extra labor and hands and, in the confined spaces often associated with aircraft, can require tedious and time consuming manual operations.

A mechanism utilizing one bolt to mount an accessory on an aircraft engine is depicted in U.S. Pat. No. 2,683,006, entitled "Accessory Mounting Means," by A. D. Nichols. In a first embodiment an engine pad adapter is provided with a circular flange at its inner diameter which is internally threaded with helical splines. An accessory pad adapter is provided with a circular flange at its inner diameter which is externally threaded with helical splines adapted to cooperate with the internal splines of the engine pad adapter. Assembly is effected by rotating the accessory and the accessory pad adapter relative to the engine pad adapter, thereby thread joining the accessory to the engine. Bosses are provided on both adapters, which, because of location, permit insertion of a bolt through both bosses. The members are locked together when a nut is securely threaded on the bolt. This mounting approach suffers from two of the problems enumerated hereinabove. First, in requiring that the accessory be rotated, a very cumbersome and undesirable labor intensive operation is necessitated, particularly when heavy accessories are used. Secondly, severe vibrations can wear and loosen the single bolt and nut locking element, thereby requiring frequent maintenance inspections and tightening operations.

A second embodiment depicted in the '006 patent utilizes torque transmitting splines or lugs on an accessory pad. The splines are adapted to project between torque transmitting splines or lugs on an engine pad adapter. A lock ring which overlaps a portion of the accessory adapter is then threadedly secured to the engine adapter and locked in place by a bolt-nut arrangement. The bolt passes through a boss associated with the engine or engine adapter and another attached to the lock ring. Thus, one bolt prevents the lock ring from loosening. This particular embodiment suffers from the same vibration sensitive wear and loosening problem as discussed hereinabove. Frequent inspection and maintenance operations are required due to the typically high vibration environment associated with aircraft engine operation.

Another approach which is susceptible to vibration induced loosening and wear problems is disclosed in U.S. Pat. No. 2,368,537, entitled "Power Plant Accessory" by S. Gilbert. This patent utilizes a split clamp which overlaps abutting flanges, one of the flanges being attached to a mounting support, the other being part of the accessory. The split clamp overlaps the abutting flanges and is secured thereon by two fasteners, disposed on opposite sides of the clamp. Not only is this type of split clamp subject to frequent loosening via engine and craft vibration but assembly of the clamp elements about the flanges requires a manual assembling operation rendered difficult by space limitations often associated with the area surrounding an aircraft engine.

Yet another variation utilizing a clamp type ring can be found in U.S. Pat. No. 2,439,161 entitled "Attaching Means," by G. B. DuBois. In the '161 patent an engine adapter ring and a portion of the accessory to be mounted are provided with interfitting lugs and fingers. The adapter ring is provided with a plurality of axially extending fingers, each of which is formed with a lug or outwardly directed flange at its free end. The outer surface of the accessory is provided with a plurality of circumferentially spaced lugs adapted to be received between the fingers of the adapter ring. Adjacent sides of the adapter ring and accessory lugs are spaced apart and machined or beveled to receive an inwardly beveled clamp ring, which when tightened by a bolt, causes a wedging action between the beveled sides assembling the members together. Again, as discussed hereinabove, intense vibration frequently encountered within aircraft environments tends to cause wear and loosening problems requiring frequent inspection and maintenance procedures. In addition, utilization of machined and beveled surfaces requires expensive machining operations in manufacturing the mounting assemblies.

Several other variations of prior art devices utilizing clamp type rings for securing two members together are depicted in U.S. Pat. No. 2,544,151 to S. Gilbert et al, entitled "Element And Accessory of Power Plants;" U.S. Pat. No. 2,553,220 to H. Troeger, entitled "Quick Detachable Means;" U.S. Pat. No. 2,697,570 to J. R. Snyder, entitled "Quick-Attaching Device;" and U.S. Pat. No. 2,978,265 to H. E. Cluff et al, entitled "Quick Disconnect Coupling." All of these patents disclose a clamp-type ring for securing flange structures together via activation of a single fastening device attached to the ends of the clamping ring. These devices are subject to many of the same wear, loosening, inspection and maintenance problems discussed hereinabove.

Also known in the prior art are interconnect systems which work through the utilization of slotted interconnect of the two members being assembled. That is, one of the members to be assembled is provided with protruding bolts circumferentially spaced and carrying nuts on the ends thereof. The other member is provided with a plurality of key slots circumferentially spaced such that the protruding bolts carrying the nuts can be passed through the large end of corresponding key slots. The two members are then rotated relative to each other such that the bolts move circumferentially to the narrow end of the slots. The individual nuts can then be tightened against the surface adjacent the narrow portion of the slots, thereby securing the two members together. This particular type of interconnect system is difficult in an environment where rotation of either or both of the members is difficult, or where there are severe limitations as to working area available, as is often the situation when mounting heavy accessories to aircraft engines.

In view of the problems associated with the aforementioned prior art devices, there is a need for an improved attach-detach mechanism and process for the securing of one member to another. Ideally the mechanism and process should provide for a good, positive, multiple fastener connection between members which will resist vibration and harsh environment wear and loosening problems. Such a connection should simultaneously be adapted to be quickly accomplished with a minimum of labor and with little or no relative rotation of the members, so as to be utilizable in a severely limited working area, as, for example, areas typically found in and around aircraft engines.

From the foregoing, it can be seen that it is a primary object of this invention to provide a quick attach-detach mechanism for attaching one member to another whereby securement of the members together is positive and highly resistant to wear and loosening effects as a result of vibrations encountered during use.

It is also an object of this invention to provide a quick attach-detach mechanism which can be utilized in a space restricted work area, and which can be utilized to accomplish securing of two members to each other in such a restricted area without appreciable rotation of either member relative to the other.

A further object of this invention is to provide a quick attach-detach mechanism for mounting an engine accessory such as a dynamoelectric machine to the accessory gearbox of an aircraft engine whereby the mechanism is resistent to severe wear and loosening effects of engine vibration.

A still further object of this invention is to provide an accessory attach-detach mechanism which utilizes several securement elements, operates as a quick assembly and disassembly mechanism in a limited working area, functions without the need to rotate either the accessory or the member to which the accessory is to be mounted, and is simple to manufacture, requiring few, if any, complex and expensive machining operations.

DISCLOSURE OF INVENTION

The invention is directed to a slot-type accessory mounting and a process for mounting or dismounting one member to or from another, and, in particular, to an accessory mounting and process for mounting or dismounting a dynamoelectric machine to or from an aircraft engine. The quick attach-detach (QAD) mechanism of the present invention includes a flange having a plurality of circumferentially spaced axially protruding studs. The flange is secured to the aircraft engine or a part thereof by any suitable means such as, for example, by threaded fasteners. A slotted collar is rotatably secured to the dynamoelectric machine or the like accessory by a retaining ring which is attached to the machine by suitable means, such as by threaded fasteners. The slots in the collar are adapted to engage the studs protruding from the flange, and are tapered in such a way that the studs, including the nuts threaded thereon may pass through the larger end of each slot, but not through the narrow end. An alignment pin is provided on the retaining ring to assure proper alignment of the dynamoelectric machine and the engine.

Installation is accomplished by aligning the dynamoelectric machine with the engine. This is done by first aligning the pin with a pin alignment bore then, bringing the two members together, and passing the nut-carrying studs protruding from the flange through the larger end of the collar slots. The collar is then rotated until the studs are received in the narrow end of the slots so that the collar-engaging side of the nuts engage the face of the collar. The nuts are then torqued, locking the assembly in place.

The novel features which are believed to be characteristic of the invention, both as to its organization and its method of operation, together with further objects and advantages thereof, will be better understood from the following description, taken in connection with the accompanying drawings in which a presently preferred embodiment of the invention is illustrated by way of example. It is to be expressly understood, however, that the drawings are for purposes of illustration and description only and are not intended as a definition of the limits of the invention.

BRIEF DESCRIPTION OF DRAWINGS

FIG. 4 is a front view of the flange element depicted in FIG. 3; and

FIG. 4A is a section taken along line 4A—4A therein;

FIG. 5 is a front view of the retaining ring element depicted in FIG. 3; and

FIG. 5A is a section taken along line 5A—5A therein;

FIG. 6 is a front view of the slotted collar element depicted in FIG. 3; and

FIG. 6A is a section taken along line 6A—6A therein;

BEST MODE OF CARRYING OUT THE INVENTION

Figure 1:
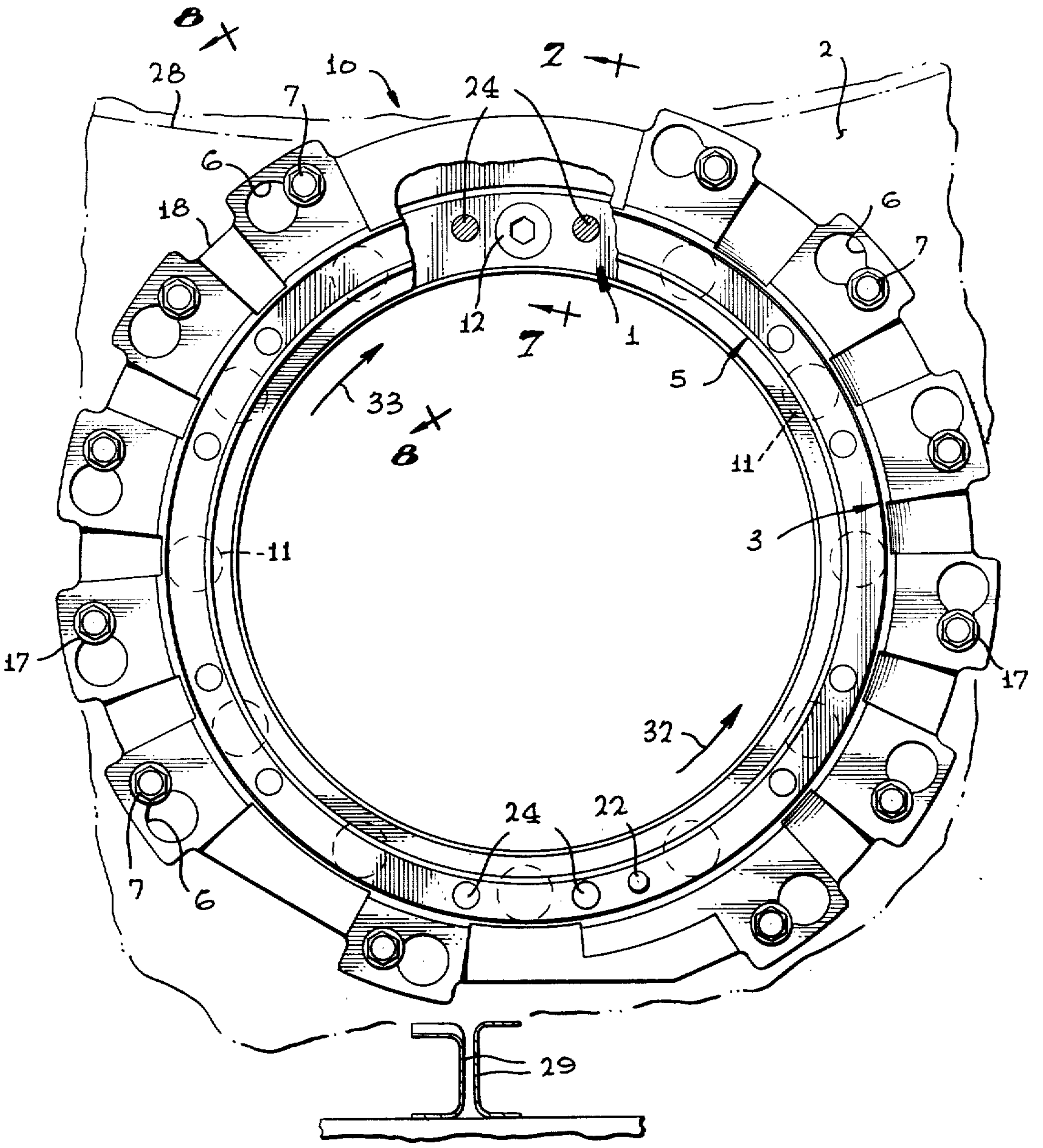
FIG. 1 is a front elevation partially broken away of an accessory mounting assembly in accordance with the present invention showing the mounting assembly mounted to the gear box portion of an aircraft engine.
Figures 2, 7, 8:
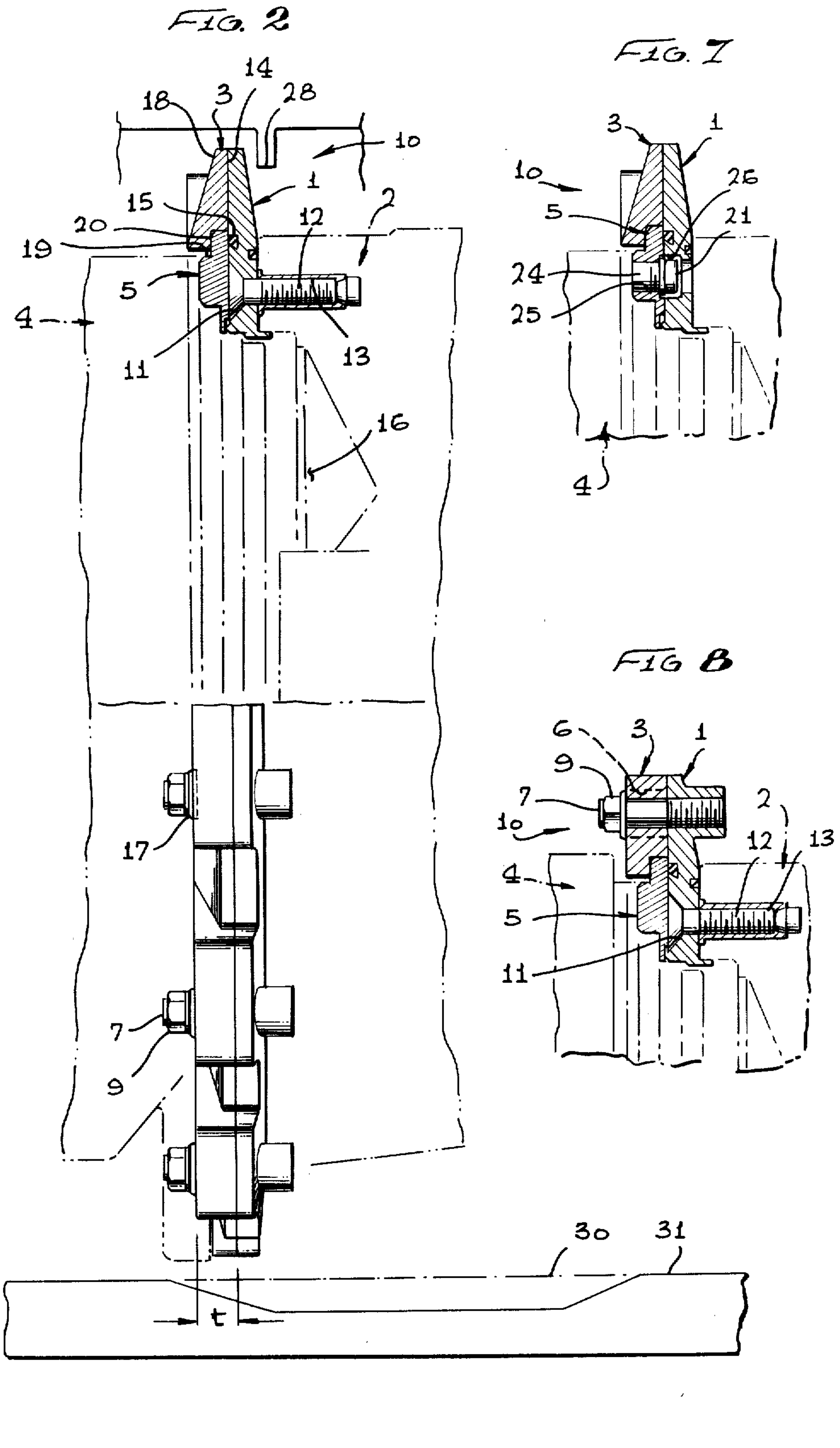
FIG. 2 is a side view of the accessory mounting assembly depicted in FIG. 1, with the top half of the figure shown in section.
FIG. 7 is a cross-section view taken on line 7—7 of FIG. 1, showing the fastening of an element of the accessory mounting assembly of FIG. 1 to a portion of the accessory which is to be mounted to the gear box portion of the aircraft engine.
FIG. 8 is a cross-section taken on line 8—8 of FIG. 1.

Referring now to the drawings, wherein like numerals denote like parts, FIGS. 1 and 2 show front and side views respectively, of an accessory mounting 10 in accordance with the present invention. The mounting assembly 10 includes a flange 1 which is secured to a gearbox 2 (partially shown in phantom) associated with an aircraft engine (not shown). Flange 1 (FIGS. 2, 3, 4, and 4A) is provided with countersunk throughbores 11 for receiving screws 12 flush with surface 14. Screws 12 are threadedly engaged in threaded boxes 13 (FIGS. 2 and 8) provided in gear box 2 and secure the flange 1 to the gearbox 2. An O-ring 15 is placed between the contacting surfaces of flange 1 and retaining ring 5 to prevent outlet of oil from the gearing chamber 16. The flange 1 also includes a plurality of studs 7 spaced circumferentially around the periphery thereof, the studs 7 projecting axially in a direction away from gearbox 2.

A second element of the accessory mounting assembly 10 of the present invention comprises a slotted collar 3 (FIGS. 1, 2, 3 and 6). The slotted collar 3 is provided with a series of circumferentially spaced slots 6 which are radially and circumferentially positioned so as to accept studs 7. The thickness (t) of slotted collar 3 (FIG. 6A) is such that the collar may be rotated relative to the studs and gearbox 2 when a plurality of nuts 9 are loosely maintained on studs 7. The slots 6 in FIGS. 1 and 6 are keyhole type slots, the larger end of which are of a size sufficient to allow stud nuts 9 to pass through while the narrow elongated portion thereof is just of a size to receive studs 7 upon rotation of collar 3. Nuts 9 can be of any known type adapted for securing parts for use in a high vibration environment, and as can be seen in FIGS. 1 and 2 may be of the captive washer type. Two of the keyhole slots shown in FIGS. 2 and 6 are provided with spotfaces 8 of a dimension sufficient to allow the washer portions 17 of nuts 9 to make contact with collar 3 below the outside face thereof. These spotfaces function as additional safety means for preventing rotation of collar 3. Although two spotfaces 8 are depicted, it should be apparent that any number of spotfaces would be sufficient to carry out such a safety function. In order to reduce the weight of slotted collar 3 the portions 18 between the slots 6 are of a reduced diameter—tapered cross section construction. (See FIGS. 1-3 and 6).

Figure 3:
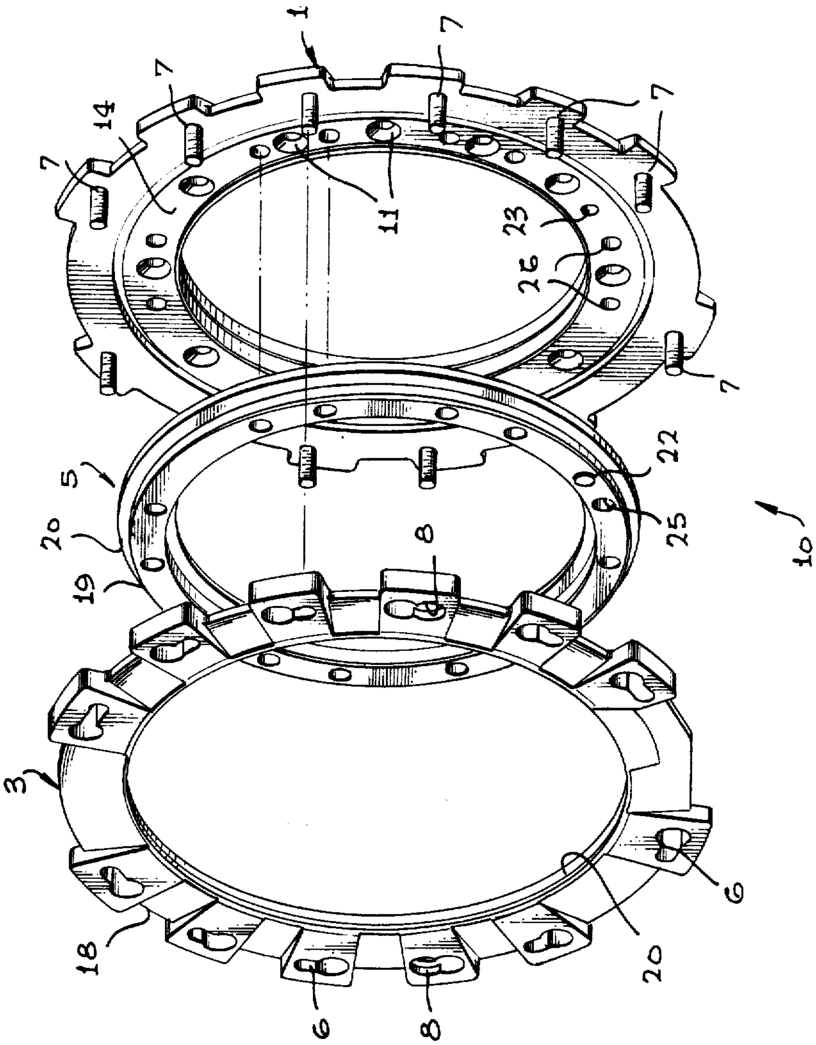
FIG. 3 is an exploded perspective view of the accessory mounting assembly of the present invention.

As can best be seen in FIGS. 2–3, slotted collar 3 is maintained in rotatable engagement with engine accessory 4 by retaining ring 5 (shown also in FIG. 5). The retaining ring 5 is constructed with an outer shoulder 19 which is of a size and dimension to mate with inner shoulder 20 of slotted collar 3. Thus, when retaining ring 5 is fastened to engine accessory 4, via stud nuts 21 (FIG. 7) threadedly engaged with studs 24, which are fixed in and extend from the engine accessory 4 slotted collar 3 is maintained in rotatable position behind retaining ring 5. Retaining ring 5 is provided with throughbores 25 for receiving studs 24, while flange 1 is provided with throughbore areas 26 axially aligned with the bores 25 and of a dimension sufficient for receiving stud nuts 21. With this particular arrangement, all three elements of accessory mounting assembly 10 are capable of being arranged in face to face surface contact. While it is contemplated that throughbores 26 be utilized to accept stud nuts 21, under certain dimensional situations it might of course be possible to place countersinks or recesses in the surface of flange 1 for acceptance of these nuts.

The flange 1 is also shown in FIGS. 3 and 4 as being provided with a bore 23 for receiving an alignment pin 22 which is fixed in and projects from the far side of retaining ring 5, as reviewed in FIG. 3. The alignment pin 22 assures proper rotational alignment of engine accessory 4 and gearbox 2.

The engine accessory 4 may comprise any accessory which it is desired to mount to an aircraft engine or portion thereof, and in this particular embodiment consists of a constant speed drive mechanism attached to a generator.

Referring again to FIGS. 1 and 2, it can be seen that in attaching an accessory such as a constant speed drive and generator assembly to an aircraft engine severe space limitations are often encountered. To clarify this point, various portions of aircraft parts which might typically be found in the area around an aircraft engine are depicted by fan case contour lines 27, flange contour 28, engine compartment doors 29 and right and left door longitudinal channel contours 30 and 31. While these figures depict the mounting of an aircraft engine accessory such as a generator to an aircraft engine it should nevertheless be obvious that the mounting assembly of the present invention may find use in other environments whenever it is desired to be able to firmly and quickly mount one member to another while providing at the same time the ability to quickly disassemble the members.

The process of mounting an accessory 4 on an engine gearbox 2 in accordance with the present invention is carried out as follows. Nuts 9 are threaded onto studs 7 protruding from flange 1. Flange 1 is secured to the gearbox 2 by screws 12 and the nuts 9 are set a distance from the face of flange 1 which is greater than (t), the thickness of slotted collar 3. Slotted collar 3 is then rotably mounted to engine accessory 4 by first securing retaining ring 5 to the engine accessory 4. Securing is carried out by placing stud nuts 21 on studs 24 projecting from engine accessory 4. To carry out the mounting operation the accessory 4 is next elevated, and then brought into abutting contact with gearbox 2, with bore 23 in flange 1 and alignment pin 22 on retaining ring 5 being engaged to assure correct alignment.

After abutting the retaining ring 5 against flange 1 and thereby positioning accessory 4 in final relation to gearbox 2 the slotted collar 3 is rotated and pushed toward flange 1 such that the studs 7 carrying nuts 9 pass through the larger end of slots 6. The slotted collar 3 is then rotated so that the studs 7 are fully accepted by the narrow ends of slots 6. The nuts 9 are then torqued, two of the nuts being seated in spotfaces 8, and the final assembly of the accessory 4 to gearbox 2 is completed.

For very heavy accessories which are mounted on a jet engine for example, it is relatively easy to determine and mark a fixed datum point such as the top of the accessory when assembled correctly to the engine. When so determined and marked, the accessory can be placed on a jack device such that it need only be elevated and moved forward into final position with little or no rotation of the accessory required. As stated hereinabove, when working in very limited spaces and with very heavy accessories rotation of the accessory to assemble is highly undesirable.

In order to enhance the quick attach-detach aspects of the instant invention, nuts 9 should only be slightly backed off the surface of slotted collar 3 when disassembling. For example, in servicing or changing the accessory 4 the nuts 9, with the exception of the nuts seated in spotfaces 8, can be loosened about one-half to one turn. Nuts seated in spotfaces 8 must of course be backed off an amount sufficient to clear the surface of collar 3. The collar 3 can now be rotated, and upon reassembly of a repaired or replacement accessory, can readily be rotated into position whereupon less than about one turn of the nuts 9 firmly secures the accessory to the engine gearbox. In such a reassembly operation, the steps of securing the retaining ring, collar, and flange to the members to be assembled are not necessary. In this assembling operation, therefore, one need only elevate and axially move the accessory 4 relative to gearbox 2, utilizing pin 22 and bore 23 to assure proper alignment. Collar 3 is then moved over studs 7 and nuts 9 and rotated as set forth above, after which the nuts 9 are torqued to tighten the assembly. Thus, it should be apparent that once a fleet of planes, for example, have been fitted with the QAD mechanism of the instant invention, repair, maintenance and replacement operations involving engine accessories will be rendered more efficient and economical.

While the QAD accessory mounting mechanism and process of the present invention has been described with reference to particular embodiments, it should be understood that such embodiments are merely illustrative as there are numerous variations and modifications which may be made by those skilled in the art. Thus, the invention is to be construed as being limited only by the spirit and scope of the appended claims.

Industrial Application

The QAD mechanism and process is useful, for example, in assembling and servicing aircraft engine accessories by providing a quick, positive and efficient system for attaching and removing engine accessories to and from aircraft engines.

We claim:

1. A quick attach-detach mechanism for mounting a first member to a second member comprising:

a collar means rotatably coupled to said first member, said collar being slotted to provide a pattern of circumferentially spaced slots;

a plurality of fastener means secured to said second member, said fasteners being circumferentially spaced and adapted to pass through a first portion of said slots upon relative axial movement between said collar means and said second member, said fasteners and said slots being further adapted to mount said first member to said second member upon rotation of said collar, each said fastener means comprising a shaft element and an enlarged element adapted for movement along said shaft.

2. The quick attach-detach mechanism of claim 1 wherein said shaft element comprises a threaded stud and said enlarged element comprises a nut, said nut being movable along said stud upon rotation of said nut.

3. The quick attach-detach mechanism of claim 2 wherein each of said slots defines at least two throughbore portions of different dimensions, the larger of said throughbore portions being adapted to pass both said threaded stud and said nut therethrough, and the smaller of said throughbore portions being adapted to receive said shaft element therein while maintaining said nut in overlap relation with a portion of the face of said collar.

4. The quick attach-detach mechanism of claim 2 wherein said slots are keyhole slots, the larger portion of said keyhole being adapted to pass both said stud and said nut therethrough, and the smaller portion being adapted to receive said stud therein while maintaining said nut in overlap relation with a portion of the face of said collar.

5. The quick attach-detach mechanism of claim 1 including a retaining ring, wherein said collar means being rotatably coupled to said first member by said retaining ring.

6. The quick attach-detach mechanism of claim 5 wherein said collar includes an inner shoulder, and said retaining ring includes an outer shoulder, said inner and outer shoulders being adapted to rotatably couple said collar means to said first member and to firmly mount said first member to said second member upon rotation of said collar.

7. The quick attach-detach mechanism of claim 1 including a flange connected to said second member, said fastening means being secured to said flange.

8. The quick attach-detach mechanism of claim 7 including a retaining ring having an alignment pin and said flange includes a bore adapted to receive said pin such that said first and second members are properly aligned when said pin is positioned within said bore.

9. The quick attach-detach mechanism of claim 4 wherein at least one of said keyhole small portions includes a spotface adapted to receive and engage one of said nuts below said collar face upon tightening of said nut.

10. The quick attach-detach mechanism of any one of claims 1, 4, 6 or 7 wherein said first member comprises an engine accessory and said second member comprises an aircraft engine.

11. A quick attach process for mounting a first member to a second member:

rotatably coupling a collar to said first member, said collar being provided with a pattern of circumferentially spaced slots;

securing a plurality of fastener means to said second member in a circumferentially spaced arrangement whereby said fastening means are adapted to pass through a first portion of said slots upon relative axial movement between said collar and said second member, comprising a threaded stud and a mating nut;

moving said collar and said second member axially relative to each other and passing said fastening means through said first portion of said slots, positioning said nut along said stud a distance from said second member greater than the thickness of said collar; and rotating said collar relative to said second member to mount said first member to said second member.

12. The process of claim 11 wherein said slots include a second portion smaller than said first portion, said step of rotating comprising rotating said collar relative to said second member to move said studs within said second portion and to place said nuts in overlap relation with a portion of the face of said collar.

13. The process of claim 12 including the step of torquing said nuts after said rotating step to firmly mount said first member to said second member.

14. The process of claim 11 wherein said collar is provided with an inner shoulder, and further including the step of providing a retaining ring having an outer shoulder portion adapted to mate with said inner shoulder, said step of rotatably coupling said collar to said first member being carried out by placing said collar in rotatable position relative to a portion of said first member and thereafter fastening said retaining ring to said first member and engaging said inner and outer shoulders.

15. The process of claim 14 wherein said fasteners project from the face of a flange element, said securing step being carried out by connecting said flange to said second member.

16. The process of claim 13 wherein at least one of said second portions is provided with a spotface in surrounding relation thereto, said spotface being adapted to receive and engage at least one of said nuts below said collar face during said torquing step.

17. The process of claim 15 wherein said retaining ring includes a locating pin and said flange includes a bore adapted to receive said pin, said step of axially moving said collar relative to said second member including the step of aligning said first and second members by inserting said locating pin in said bore.

18. The process of any one of claims 11, 12, 13, or 15 wherein said first member comprises an engine accessory and said second member comprises an aircraft engine.

19. A quick detach process for detaching an engine accessory from an engine, said accessory being mounted by an accessory mounting assembly comprising a plurality of threaded studs projecting axially from said engine in a circumferentially spaced pattern, and a collar rotatably secured to said accessory, said collar having a plurality of slots circumferentially spaced in a pattern corresponding to said threaded stud pattern, said threaded studs including nuts engaged thereon, said slots having a larger portion adapted to pass said studs and nuts and a smaller portion adapted to accept said studs while maintaining said nuts in an overlap relationship with a face of said collar, whereby when the engine accessory is firmly mounted to said engine said nuts are securely tightened against said face, comprising the steps of:

loosening said nuts without removing them from said studs;

rotating said collar to align said studs and nuts with said larger portion of said slots; and axially moving said collar away from said flange to pass said nuts and studs through said larger portions and thereby detach said accessory from said engine.

* * * * *